United States Patent [19]

Hamilton

[11] Patent Number: 4,562,330

[45] Date of Patent: Dec. 31, 1985

[54] SPOT WELD QUALITY MONITORING SYSTEM

[75] Inventor: Rodrick J. Hamilton, Whitesboro, N.Y.

[73] Assignee: Digimetrics, Inc., Yorkville, N.Y.

[21] Appl. No.: 530,754

[22] Filed: Sep. 9, 1983

[51] Int. Cl.[4] .................... B23K 11/24

[52] U.S. Cl. .................... 219/110; 219/109

[58] Field of Search .................... 219/109, 110

[56] References Cited

U.S. PATENT DOCUMENTS

| | | | |
|---|---|---|---|
| 3,389,239 | 6/1968 | Treppa et al. | 219/109 |
| 3,422,243 | 1/1969 | Meyer | 219/110 |
| 3,445,768 | 5/1969 | Ferguson | 219/109 |
| 3,582,967 | 6/1971 | Beckman | 219/110 |
| 4,242,561 | 12/1980 | Long | 219/109 |

*Primary Examiner*—Clifford C. Shaw

*Attorney, Agent, or Firm*—Harvey B. Jacobson

[57] ABSTRACT

Adjusted voltage measurements of monitored AC electrical energy supplied during a welding operation are evaluated by integration with respect to time during half cycles to develop a variable criterion each half cycle that is compared with adjusted limits to electronically make weld quality judgements. The generation of a fail signal during two consecutive half cycles as a result of such judgements, is operative through logic gating to produce a reject signal to control the marking of defective welds, interrupt the supply of energy to the welding electrodes and effect timely operation of an ejector removing articles with defective welds from a production line.

14 Claims, 5 Drawing Figures

CAN EJECTOR
REJECT LOGIC SYSTEM
INDICATORS
LO
PASS
HI
OVER
LOWER LIMIT ADJ.
UPPER LIMIT ADJ.
DISPLAY AND COMP. CKT.
RESET
LATCH
DISPLAY
VCO
ZERO ADJ.
CONTROL LOGIC
ZERO CROSS DET.
T1/T2 SIGNAL GEN.
WELDING POWER SUPPLY
POWER CONTROL

OVER RANGE
HIGH
PASS
LOW
HIGH LIMIT INDICATOR
POWER ON
OFF
AVERAGING IND.
REG OUT. #2
EJECT #1
EJECT #2
SPIKE FAIL ADJ.
FAIL INHIBIT
ZERO ADJ.
LOW LIMIT
REG. OUT. #2
FAIL INJECT
SPIKE VOLT. ADJ.

VOLTAGE
KV
V
40
44
42
46
0.09 V
1/2 Cycle
0
TIME

SPOT WELD QUALITY MONITORING SYSTEM

BACKGROUND OF THE INVENTION

This invention relates to in-process monitoring of welding conditions from which weld quality evaluations are automatically made and utilized to eject defective articles in production.

The sensing of electrical conditions and evaluation of associated parameters for determining the quality or integrity of welds is generally known as disclosed for example in U.S. Pat. No. 3,582,967 to Beckman owned by the assignee of the present application. According to the Beckman patent, the total energy delivered to a spot weld during a welding cycle through a standard welding machine is monitored by measurement of the input voltage across the welding electrodes. However, there are no heretofore known standards for the electrical conditions that occur during a welding operation to produce a weld of acceptable quality. In particular, there were no such standards available for in-process determination of quality for the spot welds formed along the seam of a can being welded by rotating electrode wheels during movement of the can along a conveyor path of a production line, so that cans with defective welds could be ejected at some location downstream of the welding station.

It is therefore an important object of the present invention to provide a method and apparatus for monitoring more meaningful conditions and evaluating measurements of such conditions during a welding operation for making rapid and accurate judgements as to weld quality.

Another object in combination with the foregoing object is to provide a method and means for utilizing the weld quality judgements to control ejection of articles with defective welds from the production line and interrupt the supply of welding energy to prevent equipment damage.

SUMMARY OF THE INVENTION

An important feature of the present invention is the discovery of certain reliable weld quality criteria from the measurement of variable electrical characteristics of the energy actually consumed in the weld nugget during the welding operation. Utilizing such discovery, voltage measurements are made of the voltage drops across the welding transformer and the circuit resistance in series between the transformer and welding electrodes to obtain a differential voltage signal, by a zero offset method. By adjustments made during such voltage measurements without any weld seam between the welding electrodes, the differential voltage signal obtained during the welding operation accurately corresponds to the energy actually consumed in heating the weld nugget. This differential voltage signal is evaluated by integration with respect to time for each half cycle of the voltage alternating frequency to produce a variable factor discovered to be an accurate quality criterion when compared with adjusted level limits for a given welding installation. When such variable factor exceeds the adjusted limits for more than one-half cycle of the AC voltage input, a fail signal is produced for an associated detection cycle corresponding to the half cycle of the AC voltage. Such fail signal is used to control ejection of the defective article at a station downstream of the welding station, mark the defective weld location and turn off heat during the welding operation to prevent damage from excessive voltage spikes.

It has been further discovered that the development of a fail signal during two consecutive half cycles signifies a bad weld. Appropriate gating circuitry is accordingly provided to transmit a reject signal to a register under the foregoing conditions, the gating circuitry being enabled by detection of a voltage spike in the differential voltage signal being evaluated. The reject signal loads a register and controls heat turn off and operation of a weld marker. The register when loaded timely operates an ejector for removal of the defective article from the production line.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
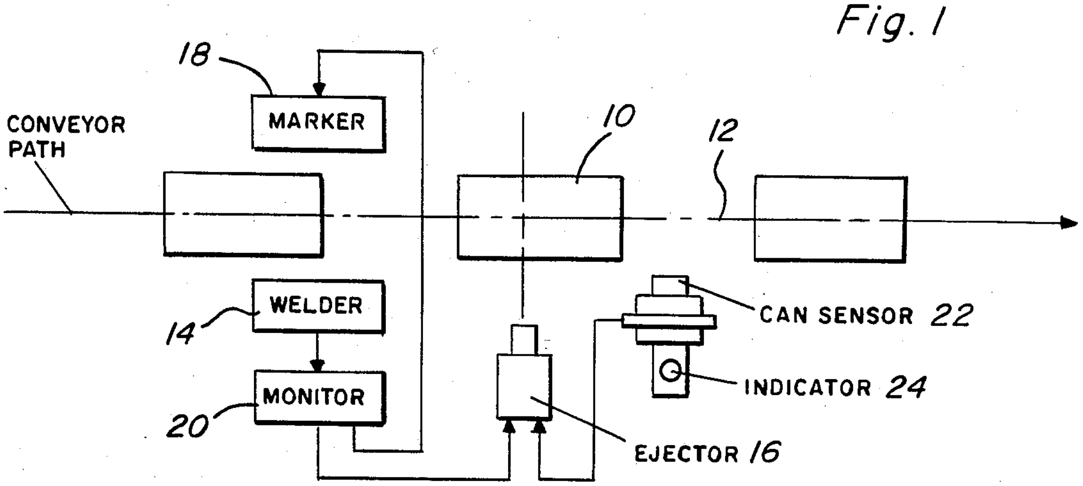
FIG. 1 is a schematic block diagram showing a typical installational arrangement for the present invention.

Referring now to the drawings in detail FIG. 1 schematically illustrates a welding arrangement for products such as cans 10 traveling along a conveyor path 12 in sequence through a welding station at which a welding apparatus 14 is located and an ejection station at which ejector 16 is located. The welder 14 is of a conventional seam welding type producing spot welds along a seam of the can, and is associated with a marker 18 adapted to mark spot weld locations along the seam. The quality of the spot welds are monitored and evaluated during the welding process by a monitor 20 in accordance with the present invention as will be explained hereinafter in detail. Monitor 20 recognizes the formation of a defective spot weld to operate the marker 18 and subsequently activate the ejector 16 for displacement of the can from the conveyor path. A can sensor 22 detects the arrival of the can at the ejection station in operative alignment with the ejector 16 so as to enable operation thereof in response to a reject signal previously generated in the monitor 20. An indicator 24 is operated to signify ejection of a can.

Figure 2:
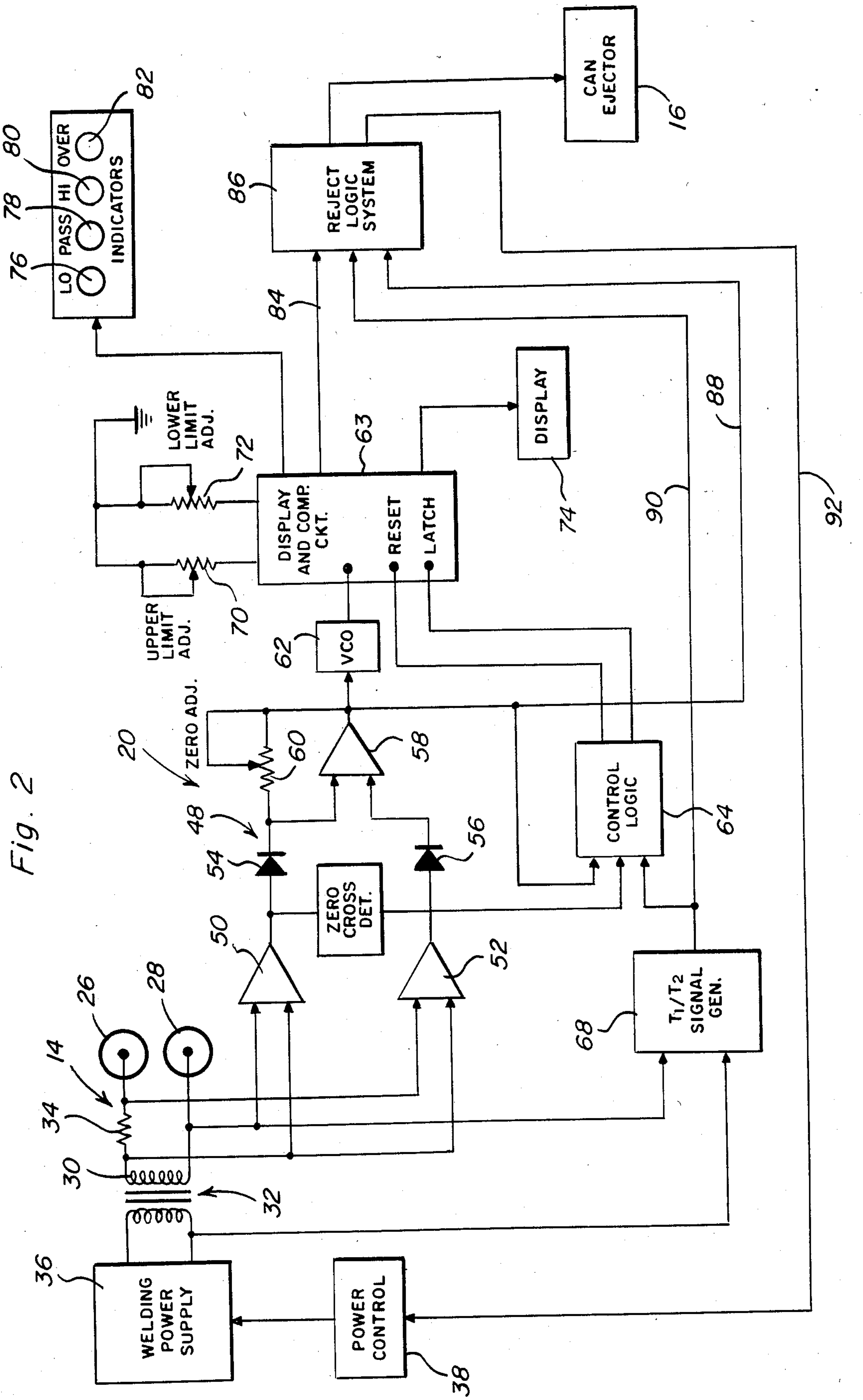
FIG. 2 is an electrical circuit diagram illustrating the system of the present invention.
Figure 5:
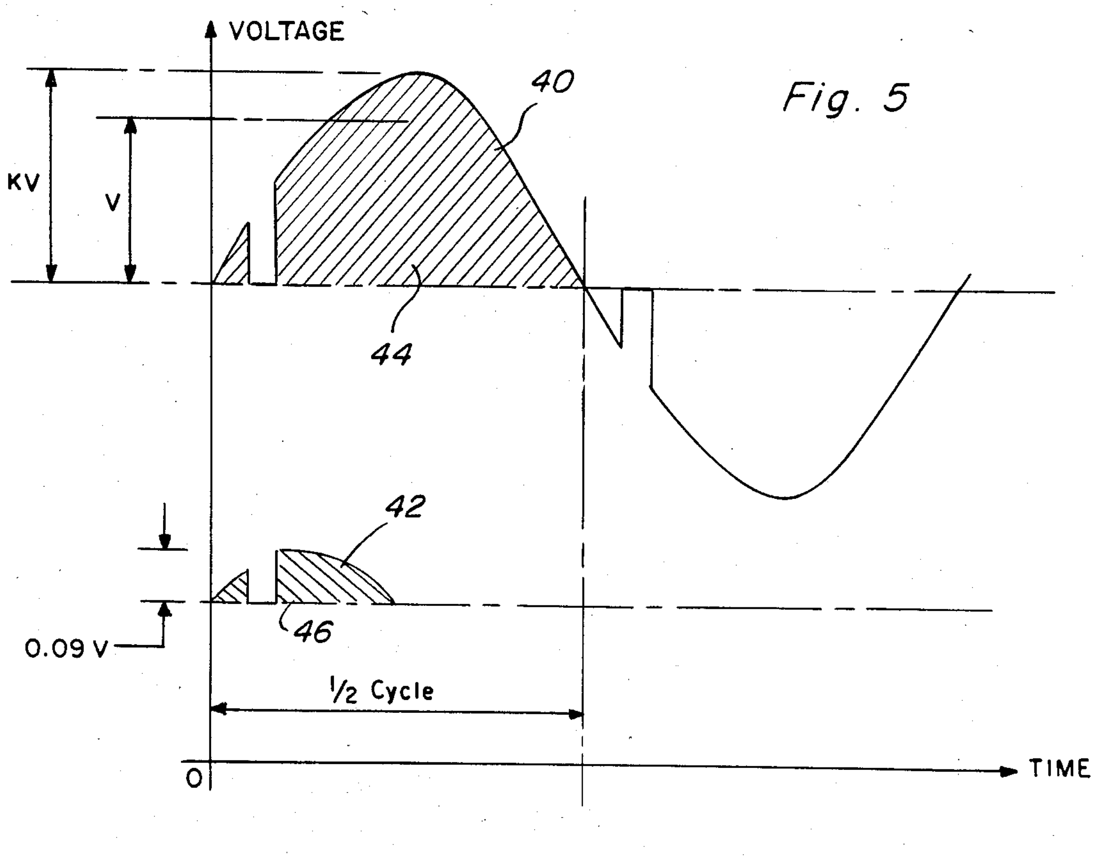
FIG. 5 is a graphical illustration of certain operating characteristics associated with the present invention.

Referring now to FIG. 2, the welder 14 is shown as including rotatable wheel electrodes 26 and 28 connected across the terminals of the secondary winding 30 of a welding transformer 32 in series with circuit resistance 34. The primary winding of transformer 32 is connected to a suitable welding power supply 36 having a power control 38 associated therewith for interrupting the otherwise continuous supply of electrical energy having an AC voltage characteristic. As depicted in FIG. 5, a sinusoidal voltage curve 40 represents the product of welding current and resistance associated with the usual spot welding operation of the welder 14 which corresponds to a volt drop of 1.56 V across the transformer winding 30 without any can seam between the electrodes and a volt drop of 1.4 V with a can seam between the electrodes. The actual energy consumed in the weld nugget during a welding operation is found to be a small fraction of the energy supplied as represented by voltage curve 42 corresponding to a volt drop of 0.09 V. The areas 44 and 46 enclosed by curves 40 and 42 during a half cycle of the AC voltage represent the energy consumed with area 44 being the total energy supplied covering circuit losses in the buss bars and wire connections. Such circuit losses are cancelled out in accordance with the present invention leaving area 46 under curve 42 which provides a more sensitive basis for monitoring weld quality.

With continued reference to FIG. 2, the energy supplied to the welder is monitored by a voltage measuring circuit generally referred to by reference numeral 48 which includes a pair of amplifiers 50 and 52 having signal outputs respectively connected by rectifiers 54 and 56 to the inputs to a zero offset differential amplifier 58. The volt drop across the transformer secondary 30 constitutes the analog input to amplifier 50 while the volt drop across circuit resistance 34 constitutes the analog input to amplifier 52. The rectified outputs of amplifier 50 and 52 are applied to differential amplifier 58 in order to produce a differential voltage signal characterizing the energy used in the formation of each weld nugget as depicted by curve 42 in FIG. 5. A zero adjustment device 60 is associated with amplifier 58 to adjust its output to a substantially zero level while circuit 48 is measuring voltage with no can seam between the electrodes 26 and 28. The output of zero adjusted amplifier 58 during the movement of a can seam between the electrodes, accordingly provides a sensitive voltage measurement corresponding to the actual energy consumed in the formation of a spot weld each half cycle of the AC voltage.

The differential voltage output of amplifier 58 is applied through a voltage controlled oscillator (VCO) device 62 to an input pin of a signal evaluating microprocessor chip 63 functioning as a display and comparator circuit to which reset and latch control signals are applied from control logic 64. The control logic receives inputs from differential amplifier 58, a zero crossing detector 66 connected to the output of amplifier 50, and a signal generator 68 connected across the windings of the welding transformer 32 to monitor its transformation ratio. The microprocessor 63 is programmed to count pulse signals from the voltage controlled oscillator 62 for a predetermined period of time, to integrate the differential voltage input received from amplifier 58 with respect to time during each half cycle and compare the level of such integrated differential voltage with upper and lower limits set by limit adjusting devices 70 and 72. The integrated differential voltage is converted into a digital output registered on display 74. A bank of indicators 76, 78, 80 and 82 connected to another output pin of chip 63 signifies the magnitude in terms of low, pass, high and overange values. When the integrated differential voltage level, representing the energy consumed during a detection cycle in the formation of a spot weld, exceeds the adjusted limits set through devices 70 and 72, a fail signal appears at yet another output pin of chip 63 connected to signal line 84 to signify a defective weld.

The fail signal in line 84 is applied to a reject logic system 86 through which operation of the ejector 16 is controlled as diagrammed in FIG. 2. The differential voltage output of amplifier 58 in line 88 and the output of signal generator 68 in line 90 are also fed to the reject logic system from which a heat turn-off signal is obtained and applied through line 92 to the power control 38 for interrupting the supply of energy to the welder as aforementioned, in order to prevent damage from excessive sparking or flashing.

Figure 3:
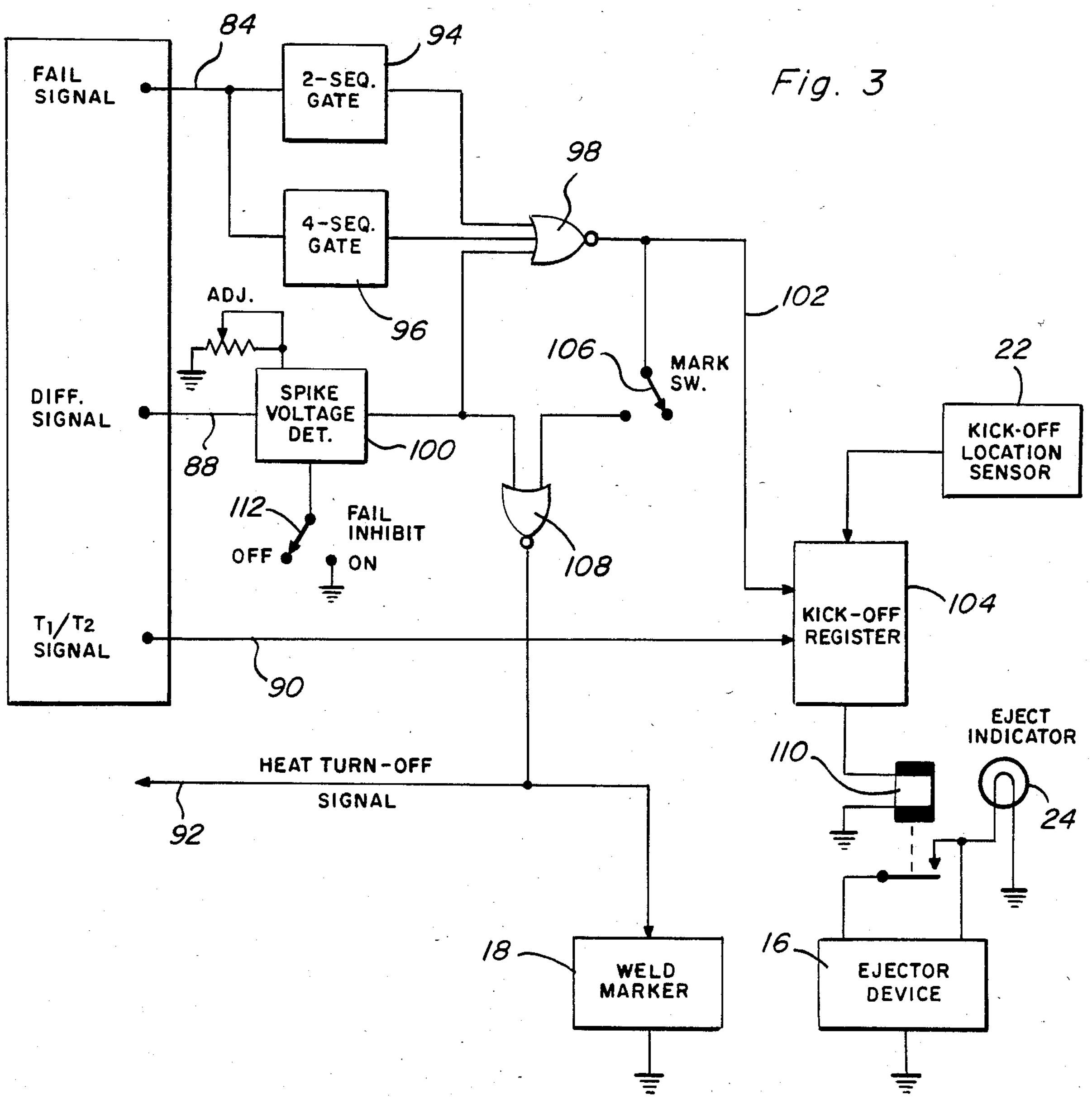
FIG. 3 is a circuit diagram showing the reject logic of FIG. 2 in greater detail.

The reject logic system 86 shown in greater detail in FIG. 3, includes a two consecutive signal gating component 94 and a four consecutive signal gating component 90 connected in parallel to the fail signal line 84. Thus, the presence of a reject signal in line 84 during two consecutive half cycles and four consecutive half cycles causes gating components 94 and 96 to respectively apply inputs to NOR gate 98. A spike voltage detector 100, such as a conventional peak detector, connected to line 88 will sense the peak voltage in the differential voltage output being evaluated to apply another input to NOR gate 98 to produce a timely reject signal in line 102 in response to fail signals in line 84 during two consecutive cycles or a spike voltage. The reject signal is stored in a register 104 for subsequent read out. The reject signal is also optionally applied through switch 106 to one input of NOR gate 108, having a second input connected to the spike voltage detector 100. Accordingly, the reject signal is alternatively effective through NOR gate 108 to produce a heat turn-off signal in line 92 which otherwise occurs when a voltage peak is present, reflecting an abnormally high resistance in the seam being welded, caused for example by lacquer or paint. The heat turnoff signal in line 92 operates the marker 18 so as to identify the defective spot weld location on the seam.

The register 104 is enabled by an operating signal in line 90 to energize a reject relay 110 following receipt of a reject signal in line 102. Such energization of relay 10 occurs when the register is triggered by a signal input from sensor 22 to operate the ejector device 16, which may be of the air discharge type. The relay is also operative to illuminate the ejection indicator 24.

The spike voltage detector 100 has a reject inhibit switch 112 associated therewith to prevent a heat turn-off signal in line 92 disenabling the detector. The voltage level at which detection occurs is set by adjust control 114.

Figure 4:
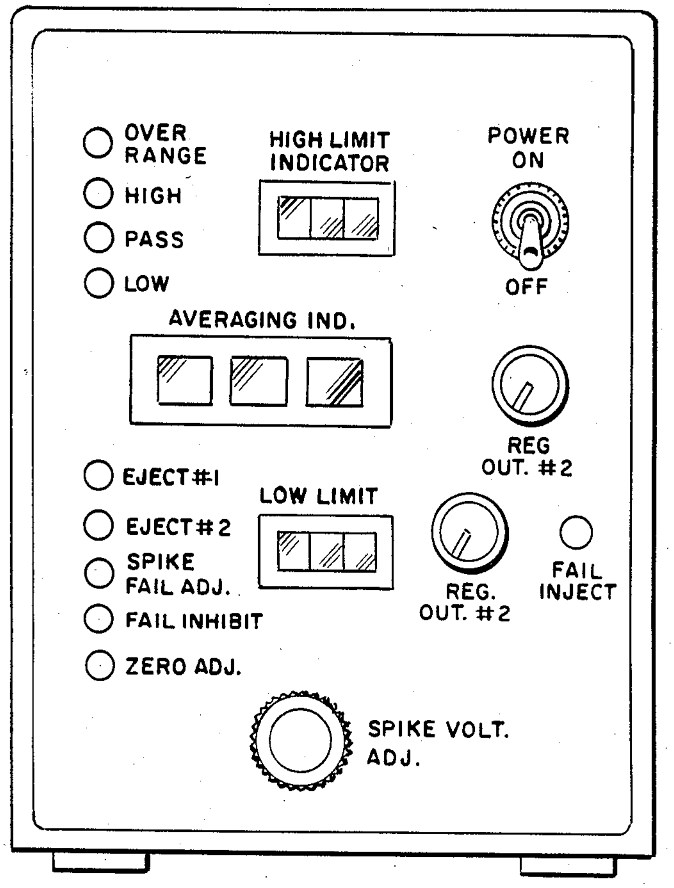
FIG. 4 is a front elevational view of a typical control panel of the monitor associated with the present invention.

All of the indicator lamps and adjustment controls hereinbefore described are mounted on a control panel 116 of the monitor 20 as shown in FIG. 4. Additionally, digital displays 118 and 120 may be provided to indicate the limit settings of the adjustment controls 70 and 72. Indicators 122 and 124 furthermore signify the upper or lower limits being exceeded while an indicator 126 is provided for registering detection of a voltage spike by detector 100. For testing purposes a fail signal may be artificially injected through line 84 by actuation of a signal inject switch 128 on the control panel.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. (Amended) In combination with apparatus for welding a seam on a product during movement along a conveyor path by applying electrical energy from an AC source across welding electrodes, a method of evaluating weld quality including the steps of: measuring a fractional portion of said applied electrical energy consumed each half cycle of said AC source to heat weld nuggets during said movement of the product along the conveyor path; cyclically detecting levels of the measured energy in excess of preset limits; and generating a reject signal in response to detection of said excessive levels during at least two consecutive half cycles.

2. (Amended) The method of claim 1 wherein said step of measuring the energy consumed includes the steps of: independently measuring voltage drops across the electrodes and circuit resistance in series therewith; comparing the measured voltage drops to produce a differential voltage drop corresponding to the fractional portion of the applied electrical energy; and integrating the differential voltage drop with respect to time for each of the half cycles.

3. The method of claim 2 including the step of: interrupting supply of the energy to the welding electrodes during measurement of said excessive levels.

4. The method of claim 3 wherein said half cycles are recognized by detection of zero levels of the measured voltage drops.

5. The method of claim 2 wherein said detection half are recognized by detection of zero levels of the measured voltage drops.

6. The method of claim 1 including the step of: interrupting supply of the energy to the welding electrodes during measurement of said excessive levels.

7. In combination with apparatus for welding a seam on a product during movement along a conveyor path by applying electrical energy from an AC source across welding electrodes, the improvement comprising means for monitoring a fractional portion of the electrical energy applied each half cycle of the AC source to the seam during said movement thereof, means connected to the monitoring means for cyclically detecting levels of the monitored fractional portion of the electrical energy in excess of preset limits, and logic means connected to the detecting means for generating a reject signal in response to detection of said excessive levels during at least two consecutive half cycles.

8. The improvement as defined in claim 7 wherein the energy monitoring means includes means for independently measuring voltage applied to the electrodes and volt drop across circuit resistance in series with the electrodes, means connected to said independent voltage measuring means for comparing the voltage measurements to develop a differential voltage signal corresponding to said fractional portion of the electrical energy applied, and means connected to one of the independent voltage measuring means and the voltage comparing means for integrating the differential voltage signal with respect to time for each of the half cycles.

9. The improvement as defined in claim 8 including spike voltage detection means connected to the voltage comparing means for interrupting supply of the AC electrical energy to the welding electrodes in response to said reject signal during measurement of peak voltage.

10. The improvement as defined in claim 9 including means connected to the logic means for ejecting the product from the conveyor path in response to said reject signal.

11. The improvement as defined in claim 10 including means responsive to said interruption of the supply of energy for marking the seam.

12. The combination of claim 11 wherein the electrodes are rotatable wheels through which the seam is spot welded.

13. The improvement as defined in claim 7 including means connected to the logic means for ejecting the product from the conveyor path in response to said reject signal.

14. In combination with apparatus for welding a seam on a product during movement along a conveyor path by applying AC electrical energy across welding electrodes, the improvement comprising means for monitoring the electrical energy applied to the seam during said movement thereof, means connected to the monitoring means for cyclically detecting levels of the monitored electrical electrical energy in excess of preset limits, logic means connected to the detecting means for generating a reject signal in response to detection of said excessive levels during a predetermined number of consecutive cycles, and spike voltage detection means connected to the monitoring means for interrupting supply of the AC electrical energy to the welding electrodes in response to said reject signal during measurement of peak voltage.

* * * * *